United States Patent [19]
Brog

[11] 3,841,210
[45] Oct. 15, 1974

[54] CHEESE PROCESSING

[76] Inventor: Larry R. Brog, P.O. Box 176, Afton, Wyo. 83110

[22] Filed: Jan. 11, 1973

[21] Appl. No.: 322,835

[52] U.S. Cl.............. 99/456, 99/461, 100/110, 426/515
[51] Int. Cl............................................ A23c 19/00
[58] Field of Search...... 99/452, 456, 461; 100/104, 100/110, 116, 113, 125; 426/361, 512, 515

[56] References Cited
UNITED STATES PATENTS

| | | | |
|---|---|---|---|
| 1,046,906 | 12/1912 | Veeman............................ | 99/461 X |
| 1,450,105 | 3/1923 | Meyers............................. | 100/113 |
| 2,077,644 | 4/1937 | Schaub............................. | 99/456 |
| 2,193,462 | 3/1940 | Miollis............................. | 426/515 X |
| 2,494,637 | 1/1950 | Stine................................ | 99/456 X |
| 2,642,797 | 6/1953 | Peters.............................. | 100/113 X |
| 2,657,994 | 11/1953 | Miollis............................. | 426/361 |
| 2,851,776 | 9/1958 | Czulak et al..................... | 99/461 X |
| 3,192,626 | 7/1965 | LeBoeuf.......................... | 99/456 |
| 3,199,195 | 8/1965 | DeBoer........................... | 100/110 X |
| 3,295,205 | 1/1967 | Sjoholm........................... | 99/456 X |
| 3,732,110 | 5/1973 | Pontecorvo...................... | 426/361 X |

Primary Examiner—John Petrakes
Attorney, Agent, or Firm—H. Ross Workman

[57] ABSTRACT

A novel cheese molding apparatus which provides for molding and processing cheese into cylindrical form, without intermediate handling of the curd, by compressing curd between semi-cylindrical mold inserts adapted to be used in conventional cheese-processing vats. The molding vat provides drainage for whey and insures a more constant temperature during the processing and molding steps. The apparatus includes an array of cutting filaments for uniformly slicing the cheese cylinders into predetermined sizes as the cheese is removed from the mold.

7 Claims, 4 Drawing Figures

CHEESE PROCESSING

BACKGROUND

1. Field of the Invention

This invention relates to cheese processing apparatus and method and more particularly to molding and slicing cheese into cylinders or "wheels."

2. The Prior Art

The method of manufacturing cheese is well-known and will be only briefly introduced so that the use of the above described invention can be better understood. Initially, milk is obtained and pasteurized. Frequently, the pasteurization process is only partial and, in the case of certain cheese, pasteurization is entirely omitted. The milk is then transferred to a cheese-making vat wherein cultures of microorganisms are introduced and a coagulant is added. In the coagulation process, the serum or watery part of the milk, called whey, becomes trapped in the coagulated milk, commonly called curd.

In order to separate the curd from the whey, it is common to cut the curd which has the effect of releasing a substantial portion of the whey allowing the whey to be separated and drained off. Thereafter, the curd is cooked at a specific temperature depending upon the variety of the cheese and excess water is removed. It will be observed, at this point in the process, that a significant amount of whey still remains trapped within the curd. The whey can be removed only by compressing the curd to force the whey to separate.

Historically, after the separation step, the curd is placed into a press for shaping or, alternatively, the curd is allowed to cure in the molding vat and is thereafter cut to an appropriate shape for sale. Some types of cheese require special cooling or treatment with brine. Until this present invention, no process has been available to simultaneously mold the curd into a cylindrical form and at the same time accommodate separation of the whey.

The manufacture of cheese has been practiced for many centuries. Until recently, cheese making has been typically a small scale, locally oriented operation. Many modern manufacturing developments have made it possible to manufacture cheese on a large scale and to simulate the conditions which were once thought to uniquely exist only in certain cheese making areas, e.g., the character of the milk used and climatic conditions of the curing site.

Traditionally, fine cheeses were made in cylindrical or "wheel" form. Recent studies continue to show that there is a demand among the public to buy cheese which is wheel shaped. Accordingly, a variety of techniques have been developed in the industry to accomplish the manufacture of cheese wheels.

Commonly, cheese wheels are made by first forming blocks of cheese and then cutting the blocks into the shape of a wheel. It will be recognized that certain types of cheese do not lend themselves to this manufacturing technique. Some cheeses, e.g., Swiss, have internal holes which are formed in the manufacturing process and represent an identifying feature of that type of cheese. When cut into wheels, the holes present an unappealing exterior appearance on the wheel of cheese.

An alternate method conventionally used in manufacturing cheese wheels is to remove much of the whey from curd in a common cheese vat and thereafter remove the curd from the cheese vat and press it into circular or cylindrical molds. Although this system of manufacture eliminates the problem previously described, it consumes an enormous amount of time and effort in multiple handling of curd and some curd is wasted in the process. In addition, the handling of the curd tends to diminish the quality of the cheese and thereby makes the cheese a lower grade and not as profitable to manufacture. Moreover, removal of whey is often extremely difficult in advance of the molding steps. Frequently an undesirable amount of whey remains with the curd and when the curd is forced into a mold, the whey cannot escape thereby diminishing the quality of the cheese.

One of the very important aspects of cheese manufacture is careful and precise regulation of the temperature of the cheese in process. The circular molds described above suffer from temperature irregularities and therefore also produce a less uniform cheese within each of the molded wheels. Therefore, in addition to the high labor costs involved in both of the above described conventional processes, there is a significant waste of curd and cheese or reduction in quality of the resulting wheel.

BRIEF SUMMARY AND OBJECTS OF THE INVENTION

The present invention includes novel cheese molding apparatus and method which provides for processing, molding and cutting cheese in one apparatus without requiring intermediate handling of the curd. The invention is capable of producing wheels of cheese within conventionally used processing vats. Furthermore, the invention provides proper drainage and allows accurate temperature control during the molding of the wheels of cheese.

It is, therefore, a primary object of this invention to provide improved cheese molding apparatus and method.

It is another object of the invention to provide wheel cheese molding apparatus which produces molded wheels of cheese without intermediate handling of the curd.

It is still another object of the present invention to provide wheel cheese molding apparatus which may be accommodated within a conventionally used processing vat.

One still further object of the invention is to provide a method for producing pre-cut wheels of cheese without intermediate handling of the curd or cheese.

These and other objects and features of the invention will become more fully apparent from the following description and appended claims taken in conjunction with the accompanying drawings.

DETAILED DESCRIPTION OF THE PREFERRED EMBODIMENT

Reference is now made to the accompanying drawing, like parts being designated with like numerals throughout.

The Molding Vat

Figure 1:
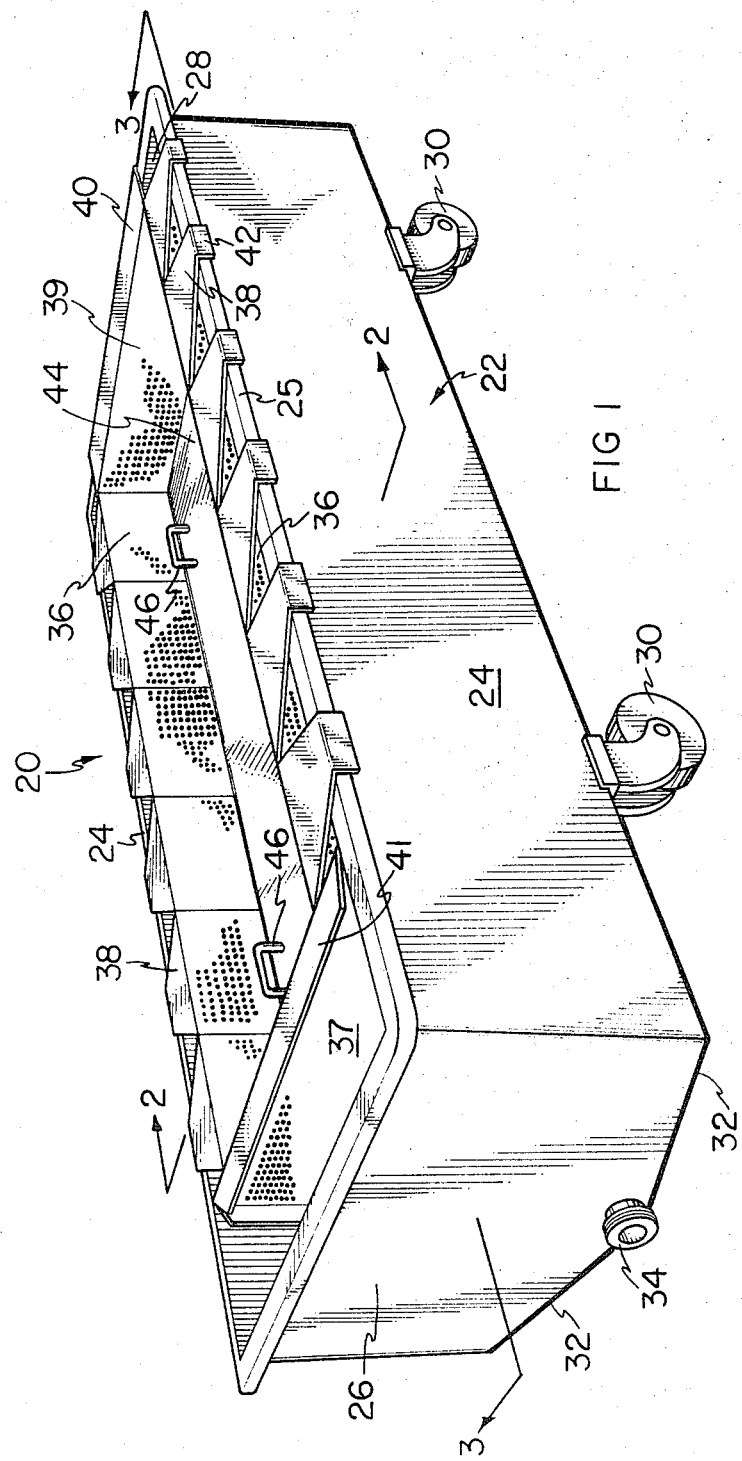
FIG. 1 is a perspective illustration of a presently preferred embodiment of the invention illustrated in fully assembled condition within a conventional cheese vat.

According to the presently preferred embodiment of the invention, and as illustrated in FIG. 1, a cheese molding assembly generally designated 20 is provided. The outer periphery of the molding assembly 20 is defined by a processing container 22 which is generally rectangular in shape and has sides 24 and ends 26 and 28.

The container 22 may be any suitable conventional cheese-making vat which provides a fluid outlet 34 for selective drainage of the vat. If desired, the container walls 24 may have a hollow interior (not shown) to provide a pathway for steam or other fluids to regulate the temperature of the container walls 22. At spaced locations along the exterior of the bottom of the container 22 castors 30 are provided. The castors 30 may be any one of a number of conventionally available wheel assemblies which accommodate place to place movement of the fully loaded molding vat.

End 26 of the container 22 is downwardly tapered toward the center from the lower sides 24. The bottom edges 32 of the end 26 thus form a slight V-shape and hold the bottom 54 of the container (FIG. 2) in a similar configuration so as to provide a drainage path essentially along the longitudinal center line of the container bottom 54. The bottom 54 is sloped from the end 28 to the end 26 so that the flow direction is toward the end 26. Accordingly, end 28 of the container 22 is shaped to complement the position of the bottom 54.

A drainage port 34 is provided slightly above the center of the V formed by edges 32. The drainage port 34 is threaded exteriorly and is in fluid communication with the inside of the processing container 22. Preferably, the drainage port 34 is formed from an easily sterilizable material such as stainless steel which facilitates keeping the assembly 20 in sanitary condition. The structure above described is conventional. Other vat configurations are also known which can be used with this present invention.

Perforated mold insert plates 36 are positioned along each side 24 of the vat 22. The insert plates 36 are vertically oriented in the vat 22 and spaced from the outwardly tapering sides 24. The plates 36 are held immovable with respect to the vat 22 by retaining brackets 38 which are releasably secured to the sides 24 at the peripheral edge 25. Brackets 38 are integral with the perforated mold insert plates 36 and provide a downwardly projecting retainer 42 which extends over the peripheral edge 25 of the sides 24. Reinforcement members 27 are integral with the plates 36 and project essentially normally therefrom to the sides 24. Members 27 prevent distortion of the plates 26 when the vat 22 is filled with milk products. Extensions 52, at the lower end of plates 36 also preserve the spacing between the sides 24 and plates 36. Also, extensions 52 rest upon a generally horizontal portion 56 of the bottom 54 to give stability to the plates 36 in the vertical plane.

Figure 3:
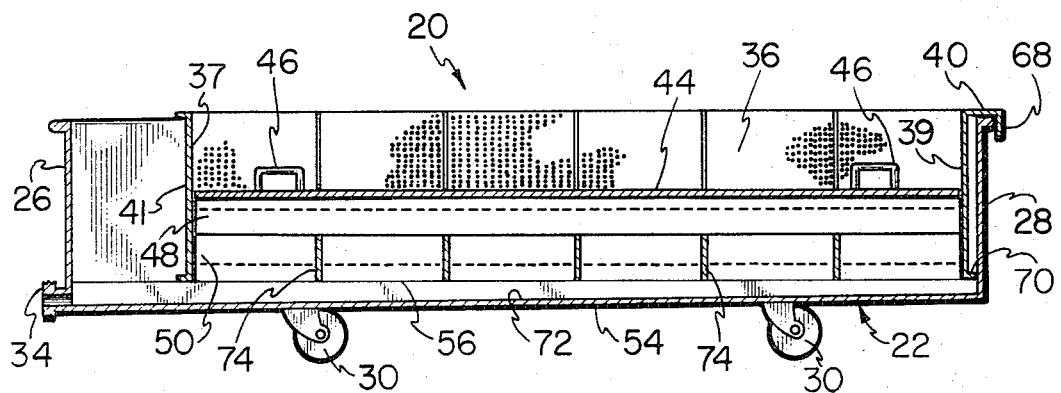
FIG. 3 is a cross-sectional illustration taken along line 3—3 of FIG. 1.

Perforated end plates 37 and 39 are located at the corresponding ends 28 and 26 of the vat 22. The end plates 37 and 39 are situated so as to form a closed rectangle with side plates 36. End plate 37 is framed with suitable reinforcement structure and is removably attached to the side plates 36 with suitable couplings (not shown). End plate 39 has an integral holding bracket 40 with tab 68 (see FIG. 3) adapted to secure the end plate 39 to the peripheral edge 25 of vat 22 and is otherwise secured against inadvertent deformity with an extension 70 on the bottom of the end plate 39 (see FIG. 3).

Figure 2:
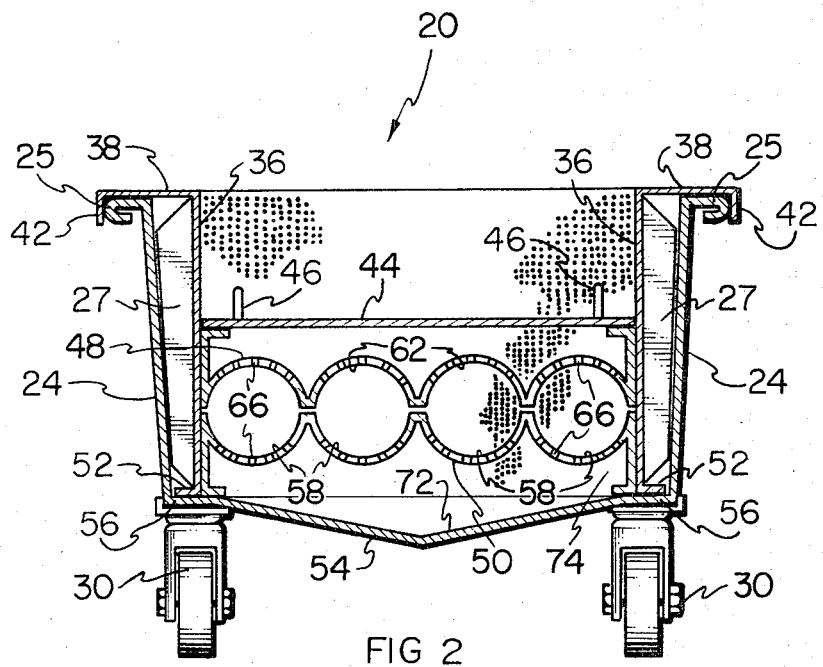
FIG. 2 is a cross-sectional illustration of the embodiment of the invention of FIG. 1 taken along line 2—2 of FIG. 1.

Referring more particularly to FIG. 2, a cross-sectional illustration of the assembly 20 is shown. The perforated insert plates 36 are situated vertically in the vat 22 and both the plates 36 and end plates 37 and 39 are spaced above the V-shaped drainage path in bottom 54, as previously described. Thus, as shown best in FIG. 3, an unobstructed drainage channel 72 traverses the length of the vat 22. A lower mold form 50 rests on the generally level edges 56 of the bottom 54. The lower mold form 50 is made from a material which is readily sterilizable and which will withstand the forces involved in the cheese molding process. The lower mold form 50 is shaped in a manner which provides at least one semi-cylindrical surface 58 along the length of the mold form. In the illustrated embodiment, four essentially identical semi-cylindrical surfaces 58 are shown. The lower mold form 50 is supported at regular intervals by vertical support plates 74 (see FIG. 3). The support plates 74 are shaped to fit the semi-circular curvature of the mold form. The support plates 74 rest upon the generally horizontal edges 56 of the bottom 54 to uniformly support the weight of the molds and cheese. Alternatively, the mold form 50 may be formed in a solid base thereby eliminating the need for support plates 74.

An upper mold form 48 is normally situated above the lower mold form 50. It should be recognized that the mold forms could be oriented side-by-side. The upper mold form 48 is configurated to complement the shape of the lower mold form 50. The upper mold form 48 has elongated semi-cylindrical surfaces 62. In combination with the lower mold form 50, the upper mold form 48 creates a plurality of cylindrical cavities comprising the cheese molds. Each of the semi-cylindrical mold forms 48 and 50 has a plurality of apertures 66, shown diametrally enlarged in FIGS. 2 and 3 for ease of illustration. The apertures 66 allow whey that is trapped with the curd to vent to the exterior of the mold forms 48 and 50 when pressure is applied, as will now be more fully described.

A press plate 44 is removably positioned horizontally and in contiguous relation upon upper mold form 48. The press plate 44 is made from a very heavy material and exerts a large vertical force upon the upper mold form 48. If desired, any suitable weight that can be distributed over the mold form 48 could be used in place of the press plate 44. Where the mold forms are oriented side-by-side, suitably aligned compressing means could be substituted for the press plate. The press plate 44 is sized to fit snugly within the rectangular space defined by the perforated mold insert plates 36, 37 and 39. Press plate 44 is shown with handles 46 to aid in lifting the press plate from the mold assembly. Of course, any other type of handle, hook, or ring would be equally advantageous. The type of lifting attachment used would significantly depend upon the procedure employed in lifting the press plate 44. Lifting the plate with a mechanical hoist (not shown) is presently preferred as will be hereinafter more fully described.

The entire press plate and mold assembly is positioned within the cavity formed by the perforated insert plates 36 so that movement between the three parts, i.e., press plate 44, upper mold form 48 and lower mold form 50, is restricted to the vertical direction only.

When the cheese has been molded within the mold forms 48 and 50, the cheese is removed by serially removing the press plate 44, the upper mold form 48 and thereafter the lower mold form 50 with the cylindrical cheeses thereon. It has been found highly desirable to combine the mentioned mold forms with the cheese cutting structure schematically illustrated in FIG. 4 to obtain uniformly sized cheese wheels.

Figure 4:
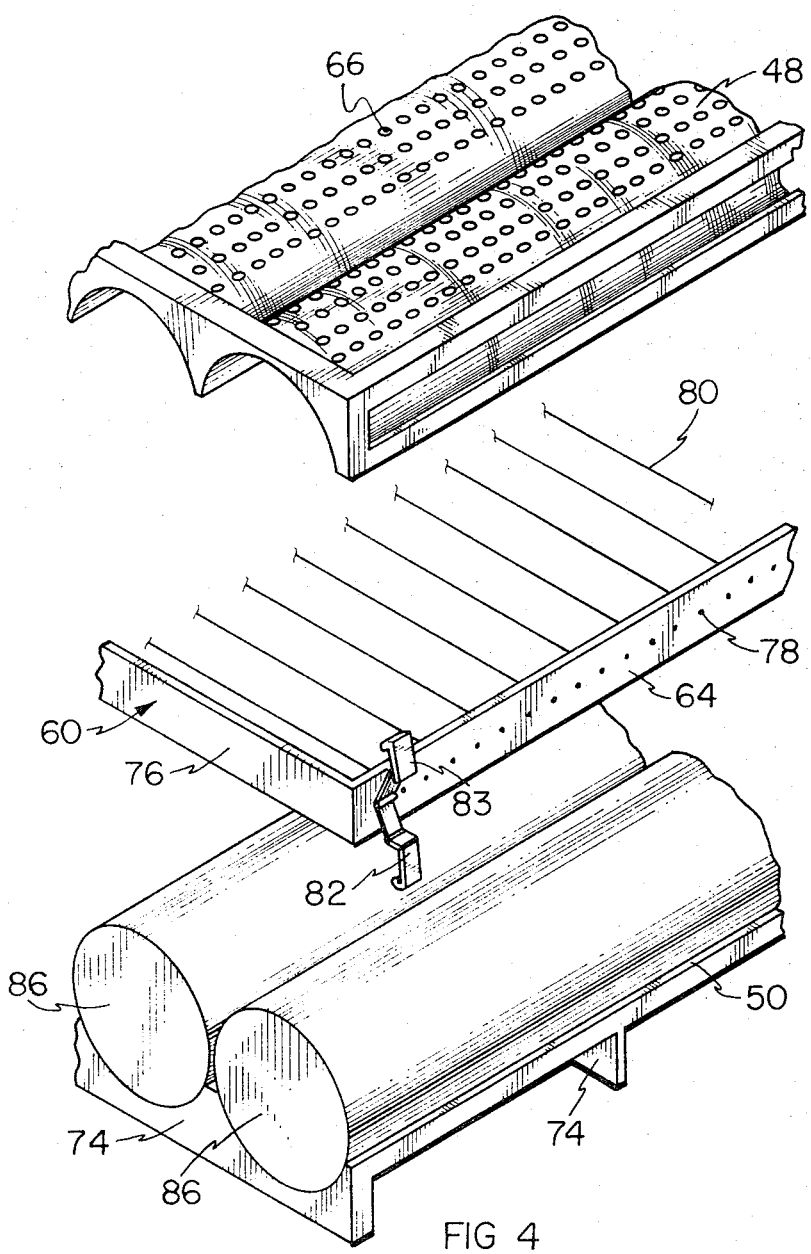
FIG. 4 schematically illustrates in fragmentary exploded perspective the mold forms and cheese with the cutting frame interposed between the mold forms.

With continued reference to FIG. 4, the upper mold form 48 is illustrated in its elevated position above the lower mold form 50. Lower mold form 50 is shown carrying molded cheeses 86. When the mold forms carrying the cheeses have been removed from the vat 22, a cutting frame generally designated 60 is interposed between the mold forms 48 and 50. The cutting frame 60 has parallel end members 76 and side members 64 joined together in a rectangle which is only slightly larger than the mold forms. A plurality of cutting wires 80 are stretched between the side members 64 into a taut condition. Preferably, the cutting wires 80 are removably secured as at 78 by conventional means to the side members 64. Accordingly, the spacing between the cutting wires 80 can be changed by removing certain of the wires 80 or adding additional ones.

It is easily understood that as the cutting frame 60 is superimposed over the mold form 50, and when a force is applied to the cutting wires, the cutting wires 80 will cut halfway through the cheeses 86. It has been found desirable to provide the cutting frame 60 with latches 82 which may be of any suitable conventional variety. The latches 82 allow the cutting frame to be immovably secured to the lower mold form 50.

The upper mold form 48 is then superimposed over the cutting frame 60 and latch 83 is secured to the upper mold form 48 so that the mold forms 48 and 50 and cutting frame 60 are secured tightly together. Thereafter, the assembled mold forms and cutting frame are rotated 180° about the longitudinal axis of the cutting frame 60 so that the mold form 48 is on the bottom. Thereafter, the latch 83 is disconnected from the mold form 48 and the cutting frame 60 and mold form 50 simultaneously lifted away from the mold form 48 thereby finishing the cut through the remaining half of the cheeses 86 and leaving the cut cheeses 86 stacked within the mold form 48. With some cheeses, additional force may be necessary to finish the cut.

The Method

When the milk used for the making of cheese has been coagulated, the curd is cut and as much of the whey as separates is removed. Thereafter, the curd is cooked at a predetermined specific temperature depending upon the variety of the cheese being made. The cooked curd is then ready for placement in the cheese molding assembly 20. The vat 22 is first prepared by lining the perforated plates 36, 37 and 39 with cheesecloth. Thereafter, the lower mold form 50 is placed in the vat 22 and a cheesecloth is superimposed over the semi-cylindrical surfaces 58. Care should be taken to be sure that all of the apertures in the perforated plates and in the mold form 50 are covered with cheesecloth.

The curd, prepared as above described, is then placed within the vat 22 over the lower mold form 50. As the whey separates from the curd, it will filter through the cheesecloth at the various perforations in the plates 36, 37 and 39 and also through the apertures 66 in the mold form. It has been found desirable to perform an initial compression step by placing the upper mold form 48 over the curd and preliminarily compressing the curd until the curd can hold a cylindrical shape. Thereafter, the mold form 48 may be removed and the pre-shaped curd covered with an additional layer of cheesecloth to be superimposed between the curd and the upper mold form 48. It should be noted, however, that in many instances the preforming step may not be necessary. In any event, a cheesecloth layer is situated between the upper mold form 48 and the curd and the upper mold form is then placed in superimposition over the lower mold form 50.

If the upper mold form is heavy, it may not be necessary to use additional weights to force the whey away from the curd and out of the mold forms 48 and 50. However, it has been found convenient to place a heavy press plate 44 over the upper mold form 48 to accelerate the compression of the curd.

As the curd is compressed, the whey will be forced into the drainage channel 72 formed by the bottom 54 of the vat 22. The drainage channel can be selectively opened at the port 34 for removal of the whey. Thus, using the cheese processing assembly 20, the molding and whey separation steps are advantageously combined in a single procedure without multiple handling of the curd. The result is a plurality of elongated cylindrical cheeses of uniform quality.

To remove the cheese, the press plate 44 is lifted from the vat 22 either manually or with a mechanical hoist. Thereafter, the upper mold form 48 is removed exposing the formed cheeses covered with cheesecloth. It has been found advantageous to use a mechanical hoist to lift the lower mold form 50, laden with cheese 86, out of the vat 22. Either before or after the lower mold form 50 is removed, the cheesecloth (not shown) overlying the cheeses 86 is removed thereby exposing the cheese to the air. Thereafter, the cutting frame 60 can be superimposed over the lower cheese frame as described above so as to cut halfway through the cheeses 86 at predetermined axial locations. In some circumstances a mechanical force is advantageously applied to facilitate cutting the cheese cylinders.

When the upper cheese form 48 is again superimposed over the cutting frame 60 (see FIG. 4), the cutting frame 60 is attached to the upper cheese form 48 so that the cheese forms 48 and 50 and cutting frame 68 may be unitarily rotated 180° about a generally horizontal axis. Thereafter, when the inverted mold form 48 is disengaged from the cutting frame 60, the cutting frame 60 and attached mold form 50 can be lifted away from the mold form 48 leaving the sliced cheese thereon.

It will be observed that the cheesecloth initially situated between the curd and the mold form 50 will now be carried away with the mold form 50 and the cutting frame 60.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A cheese molding assembly for molding cheese under atmospheric conditions comprising:
   a vat having a closed bottom and upwardly directed sides and a plurality of perforated plates serially arranged in a closed loop around the interior sides of the vat;
   a first lower mold form presenting at least one semi-cylindrical surface having a plurality of apertures therein, the mold form being spaced from the bottom of the vat and adapted to nest within the closed loop of perforated plates;
   a second mold form presenting at least one semi-cylindrical surface having a plurality of apertures therein and which complements the surface of the first mold form to define a cylindrical mold cavity, the second mold form being free floating above the first so that the vat may be moved from place to place during the molding process, the second mold form being further adapted to nest within the closed loop of perforated plates in alignment with the first mold form to define a path of movement restricted to essentially the vertical plane and means adapted to be superimposed over the second mold form so as to urge the mold forms together under the influence of gravity.

2. A cheese molding assembly as defined in claim 1 further comprising a cutting frame removably attachable to at least one of the first and second mold forms, the cutting frame comprising a plurality of cutting filaments adapted to traverse the mold cavity when the cutting frame is attached to a mold form.

3. A cheese molding assembly as defined in claim 1 wherein said urging means comprises a press plate adapted to be superimposed over the second mold form so as to exert a compressive force between the first and second mold forms.

4. A portable cheese molding assembly comprising:

a lower mold form defining at least one semi-cylindrical surface having a plurality of spaced apertures therein, the lower mold form being adapted to receive whey-bearing curd;
   a free floating upper mold form defining at least one semi-cylindrical surface having a plurality of spaced apertures therein, the upper and lower mold forms being alignable to form a cylindrical mold cavity; and
   a portable vat for receiving the first and second mold forms in nesting relation, the vat being transportable from place to place while the weight of the upper mold form forces whey in the curd to pass through the apertures in the lower mold form, the vat comprising a closed receptacle spaced below the lower mold form for receiving the whey that passes from the mold cavity.

5. A cheese molding assembly as defined in claim 4 wherein the upper and lower mold forms are separated from the walls of the vat by perforated plates.

6. In a method of producing a cylindrical cheese comprising the steps of:
   preparing a cheese vat to receive a cylindrical cheese mold by placing a plurality of plates serially in a closed loop in the vat, at least some of the plates being perforated;
   obtaining a cylindrical cheese mold comprising a lower and an upper mold form, each mold form having at least one semi-cylindrical surface having a plurality of apertures therein;
   nesting the lower mold form within the closed loop of perforated plates;
   superimposing a first layer of cheesecloth over the lower mold form so as to cover the apertures therein;
   placing a quantity of cheese curd on the lower mold form;
   superimposing a second layer of cheesecloth over the cheese curd; and
   lowering the upper mold form into mating relationship with the lower mold form so as to compress the cheese curd therebetween into a cylindrical form and expel whey from the cheese curd through the cheesecloth covered apertures.

7. In a method of producing slices of cylindrical cheese comprising the steps of:
   preparing a cheese vat to receive a cylindrical cheese mold by placing a plurality of perforated plates serially in a closed loop in the vat;
   obtaining a cylindrical cheese mold comprising a lower and an upper mold form, each mold form having at least one semi-cylindrical surface having a plurality of apertures therein;
   nesting the lower mold form within the closed loop of perforated plates;
   superimposing a first layer of cheesecloth over the lower mold form so as to cover the apertures therein;
   placing a quantity of cheese curd on the lower mold form;
   superimposing a second layer of cheesecloth over the cheese curd;
   lowering the upper mold form into mating contact with the lower mold form so as to mold the cheese curd therebetween into a cylindrical form and expel whey from the cheese curd through the cheesecloth covered apertures;
   exposing the upper surface of the molded cheese by removing the upper mold form and second layer of cheesecloth from the molded cheese;
   slicing the exposed cheese by forcing a plurality of cutting wires through the cheese, the cutting wires being attached to a cutting frame which is adapted to contact the lower mold form;
   removing the lower mold form and cutting frame from the cheese vat and inverting the lower mold form and cutting frame;
   removing the lower mold form and first layer of cheesecloth from the molded cheese; and
   raising the cutting frame so as to finish slicing the molded cheese with the cutting wires.

* * * * *